United States Patent
Kotaru et al.

(10) Patent No.: US 12,413,358 B2
(45) Date of Patent: Sep. 9, 2025

(54) DETERMINING REFERENCE SIGNAL TRANSMISSION TIMES

(71) Applicant: Microsoft Technology Licensing, LLC, Redmond, WA (US)

(72) Inventors: Manikanta Kotaru, Kenmore, WA (US); Yu Yan, Kirkland, WA (US); Paramvir Bahl, Bellevue, WA (US); Neil Agarwal, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 610 days.

(21) Appl. No.: 17/825,766

(22) Filed: May 26, 2022

(65) Prior Publication Data
US 2023/0412335 A1    Dec. 21, 2023

(51) Int. Cl.
| H04L 5/00 | (2006.01) |
| H04B 7/06 | (2006.01) |
| H04W 24/02 | (2009.01) |
| H04W 72/1263 | (2023.01) |

(52) U.S. Cl.
CPC ......... *H04L 5/0048* (2013.01); *H04B 7/0617* (2013.01); *H04B 7/0626* (2013.01); *H04W 24/02* (2013.01); *H04W 72/1263* (2013.01)

(58) Field of Classification Search
None
See application file for complete search history.

(56) References Cited

U.S. PATENT DOCUMENTS

| 2010/0124196 A1* | 5/2010 | Bonar .................. H04B 7/0689 455/445 |
| 2018/0098330 A1* | 4/2018 | Nguyen .................... G06N 7/01 |
| 2021/0242919 A1* | 8/2021 | Park ..................... H04B 7/0617 |

(Continued)

FOREIGN PATENT DOCUMENTS

| CN | 113691288 A | 11/2021 |
| WO | 2022066843 A1 | 3/2022 |

OTHER PUBLICATIONS

"Discussion on AI/ML for CSI feedback enhancement", In Proceedings of InterDigital, May 9, 2022, 7 Pages.

(Continued)

*Primary Examiner* — Jeffrey M Rutkowski
*Assistant Examiner* — Justin Michael Whitaker

(57) ABSTRACT

Aspects of the present disclosure relate to determining reference symbol transmission times. In some examples, a method for determining reference symbol transmission times for cellular communications includes receiving signal feedback based on a wireless communication channel between a wireless communication device and a base station, identifying a periodic exchange of reference symbols that are used to adjust beamforming between the wireless communication device and the base station, generating a vector based on the signal feedback, and providing the vector as an input to a trained machine learning model. A training of the trained machine learning model includes calculating a plurality of rewards for a respective plurality of transmission time delays. The plurality of rewards are each calculated based on a function of downlink throughput and uplink overhead. The function of downlink throughput and uplink overhead are based upon a priority level of the wireless communication device.

20 Claims, 9 Drawing Sheets

(56) References Cited

U.S. PATENT DOCUMENTS

2021/0351885 A1* 11/2021 Chavva .................. G06N 3/08
2021/0376895 A1 12/2021 Xue et al.

OTHER PUBLICATIONS

"International Search Report and Written Opinion Issued in PCT Application No. PCT/US2023/018400", Mailed Date: Jun. 30, 2023, 22 Pages.

* cited by examiner

DETERMINING REFERENCE SIGNAL TRANSMISSION TIMES

BACKGROUND

Demand for integration between a cloud network and a radio access network (RAN) and/or a core network for wireless telecommunications has rapidly increased. The RAN provides wireless connectivity to mobile computing devices by converting data into data packets. The core network coordinates among various parts of the RAN and provides connectivity to a packet-based network (e.g., the Internet).

With the advent of 5G, which is a system of mobile communications that improved upon aspects of the previous 4G system (reduced latency, increased bandwidth, etc.), the scope of mobile networks has increased to provide a broad range of wireless services delivered across multiple platforms and multi-layer networks. 5G specifications outline a host of performance requirements related to bandwidth, peak data rate, energy efficiency, reliability, latency (both user-plane and control-plane latency), traffic capacity, etc.

However, most 5G systems that use beamforming and/or multiple-input and multiple-output (MIMO) techniques rely upon large antenna arrays. With large antenna arrays, downlink channel estimates are used to pre-code wireless transmissions from a base station, to maximize signal strength and throughput experienced at user equipment. Since an overhead of channel estimation and feedback scales (e.g., increases) linearly as a number of antennas, devices, and bandwidths are increased, significant challenges are presented.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to methods, systems, and media for determining reference symbol transmission times.

In some examples, a method of determining reference symbol transmission times for cellular communications is provided. The method includes receiving signal feedback based on a wireless communication channel between a wireless communication device and a base station, identifying a periodic exchange of reference symbols that are used to adjust beamforming between the wireless communication device and the base station, generating a vector based on the signal feedback, and providing the vector as an input to a trained machine learning model. A training of the trained machine learning model includes calculating a plurality of rewards for a respective plurality of transmission time delays. The plurality of rewards are each calculated based on a function of downlink throughput and uplink overhead, the function of downlink throughput and uplink overhead is based upon a priority level of the wireless communication device. The method further includes selecting a transmission time delay from the plurality of transmission time delays for a reference symbol to be transmitted to the wireless communication device. The selected transmission time delay has the greatest reward of the plurality of calculated rewards. The method further includes transmitting the reference symbol, after the transmission time delay, to disrupt the periodic exchange of reference symbols.

In some examples, a system is provided. The system includes at least one processor and memory storing instructions that, when executed by the at least one processor, cause the system to perform a set of operations. The set of operations include: receive signal feedback based on a wireless communication channel between a wireless communication device and a base station, identify a periodic exchange of reference symbols that are used to adjust beamforming between the wireless communication device and the base station, generate a vector based on the signal feedback, and provide the vector as an input to a trained machine learning model. A training of the trained machine learning model includes calculating a plurality of rewards for a respective plurality of transmission time delays. The plurality of rewards are each calculated based on a function of downlink throughput and uplink overhead based upon a priority level of the wireless communication device. The set of operations further include: select a transmission time delay from the plurality of transmission time delays for a reference symbol to be transmitted to the wireless communication device, wherein the selected transmission time delay has the greatest reward of the plurality of calculated rewards, and transmit the reference symbol, after the transmission time delay, to disrupt the periodic exchange of reference symbols.

In some examples, a method for generating a precoding matrix is provided. The method includes receiving signal feedback based on a wireless communication channel between a wireless communication device and a base station, generating a vector based on the signal feedback, providing the vector as an input to a trained machine learning model, and generating, based on the trained machine learning model, a precoding matrix.

This summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Figure 1:
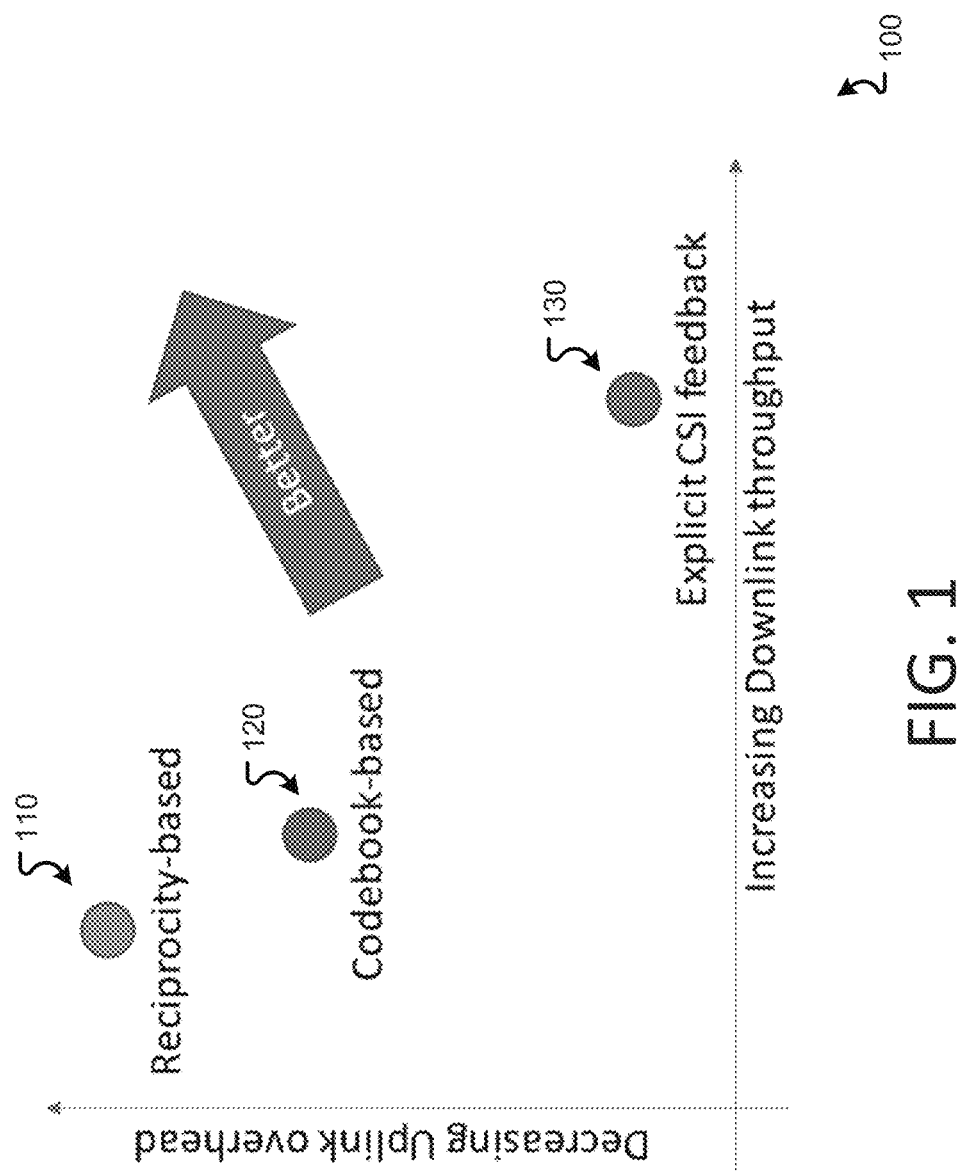
FIG. 1 illustrates an example plot comparing relative uplink and downlink frequencies for channel transmission techniques.

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

A mobile wireless telecommunication network may use a cloud service for implementing a RAN. In this case, the cloud service connects cell towers, with which mobile devices (e.g., smartphones) connect, to the public network (e.g., the Internet) and/or private networks. The cloud service provides virtual servers and other computing resources for dynamically scaling the computing capacity as needed based on the volume of data traffic. In aspects, a cloud RAN infrastructure represents an implementation of cloud services for the RAN. In contrast to a typical cloud service, the cloud RAN infrastructure includes geographical and physical constraints as well as latency constraints imposed by RAN standards. The cloud RAN infrastructure includes connection to at least one cell tower associated with a Radio Unit (RU) and cloud servers associated with one or more of a Distributed Unit (DU), a Central Unit (CU), and a RAN Intelligent Controller (RIC). The cell tower is in the field, where mobile devices connect over wireless cellular communications, and the RU of the cell tower connects to a DU of a RAN server at a far-edge datacenter. To enable real-time processing of RAN data traffic, the far-edge datacenter may be relatively close (e.g., a few kilometers) to the cell tower.

The DU is associated with network switches and processes data in a series of operations associated with at least layer one (i.e., the "PHY" or physical layer) and layer two (the "MAC" or data link layer) of the Open Systems Interconnection (OSI) model. The physical layer ("PHY") connects a data link layer device, e.g., "MAC" (medium access control), to a physical medium, e.g., optical fiber, copper cable. In aspects, transmitted data "packets" may be directed into the data link layer (layer two of the OSI model) to a destination device. A "payload" of each packet includes the transmitted data, which is ultimately extracted and used by application software.

To meet 5G requirements, layers one and two need to be processed in real time or near-real time. Advances in 5G will enable new industrial use cases, such as extended reality, that will require relatively huge throughput and massive internet of things (IoT) deployments with a high density of IoT devices. Further, beamforming and multiple input multiple output (MIMO) techniques may require large antenna arrays that support 5G industrial use cases.

Downlink channel estimates may be required to pre-code wireless transmissions from a base station, to improve signal strength and throughput experienced at a user device. However, an overhead of channel estimation and feedback scales linearly with a number of antennas, devices, and bandwidths. Therefore, conventional solutions for increasing throughout, which may include deployments that use relatively large antenna systems, present a significant hurdle for increasing throughput, while also minimizing overhead of bandwidth, time, and compute resources spent on channel estimation and feedback. Conventional systems that send frequent transmissions of channel information to a base station may increase overhead in an uplink that could otherwise be used for useful data communication.

As discussed in more detail below, the present disclosure addresses the above and other issues by providing methods and systems for determining reference symbol transmission times. Generally, aspects of the present disclosure relate to minimizing or reducing an overhead of bandwidth, time, and compute resources spent on channel estimation and feedback, while not negatively affecting a system's overall performance (e.g., bit error rate). Aspects of the present disclosure may dynamically adapt a frequency and/or timing of channel estimation and feedback, thereby recouping bandwidth and time for useful data communications (e.g., as specified by pre-determined priority levels).

For instance, some examples disclosed herein may include receiving signal feedback based on a wireless communication channel between a wireless communication device and a base station. A vector may be generated based on the signal feedback. The vector may be provided as an input to a trained machine learning model. Based on the trained machine learning model, a transmission time for a reference symbol to be transmitted to the wireless communication device may be determined. The determined transmission time may improve performance of systems disclosed herein, relative to conventional wireless communication systems that may be known to those of ordinary skill in the art.

FIG. 1 illustrates an example plot 100 illustrating relative uplink and downlink frequencies for channel transmission techniques. The techniques for channel transmission may include reciprocity based 110 techniques, codebook based 120 techniques, and explicit CSI feedback 130 techniques. These techniques are plotted with respect to decreasing uplink overhead and increasing downlink throughput. As discussed throughout the present disclosure, there exists a desire to increase downlink throughput, while reducing overhead of bandwidth, time, and compute resources spent on channel estimation and feedback.

In aspects, the reciprocity based 110 technique assumes that whatever channel state information that a base station receives in an uplink will be the same channel state information in the downlink transmission. Using such a technique, the uplink overhead may be zero or near-zero. However, the downlink throughput may suffer heavily because of an asymmetry of the downlink throughput, with respect to the uplink. Therefore, the reciprocity based 110 technique may be undesirable.

The codebook based 120 technique strikes a slight balance between decreasing uplink overhead and increasing downlink throughput. Using the codebook based 120 technique, an explicit CSI is not sent to a base station. Rather, saved pre-coded matrices are saved in a dictionary. The dictionary is known at the base station and the user device, such that a selection of a pre-coded matrix may be sent from a base station to a user device. However, the dictionary provides limited options from which codebook based systems may choose. Therefore, the codebook based 120 technique may be undesirable.

The explicit CSI feedback 130 technique sends CSI feedback to the base station, for every frame (e.g., about every 10 milliseconds). Therefore, downlink throughput may be relatively good, but uplink overhead will be relatively high due to the frequent feedback. Therefore, the explicit CSI feedback 130 technique may be undesirable.

Figure 2:
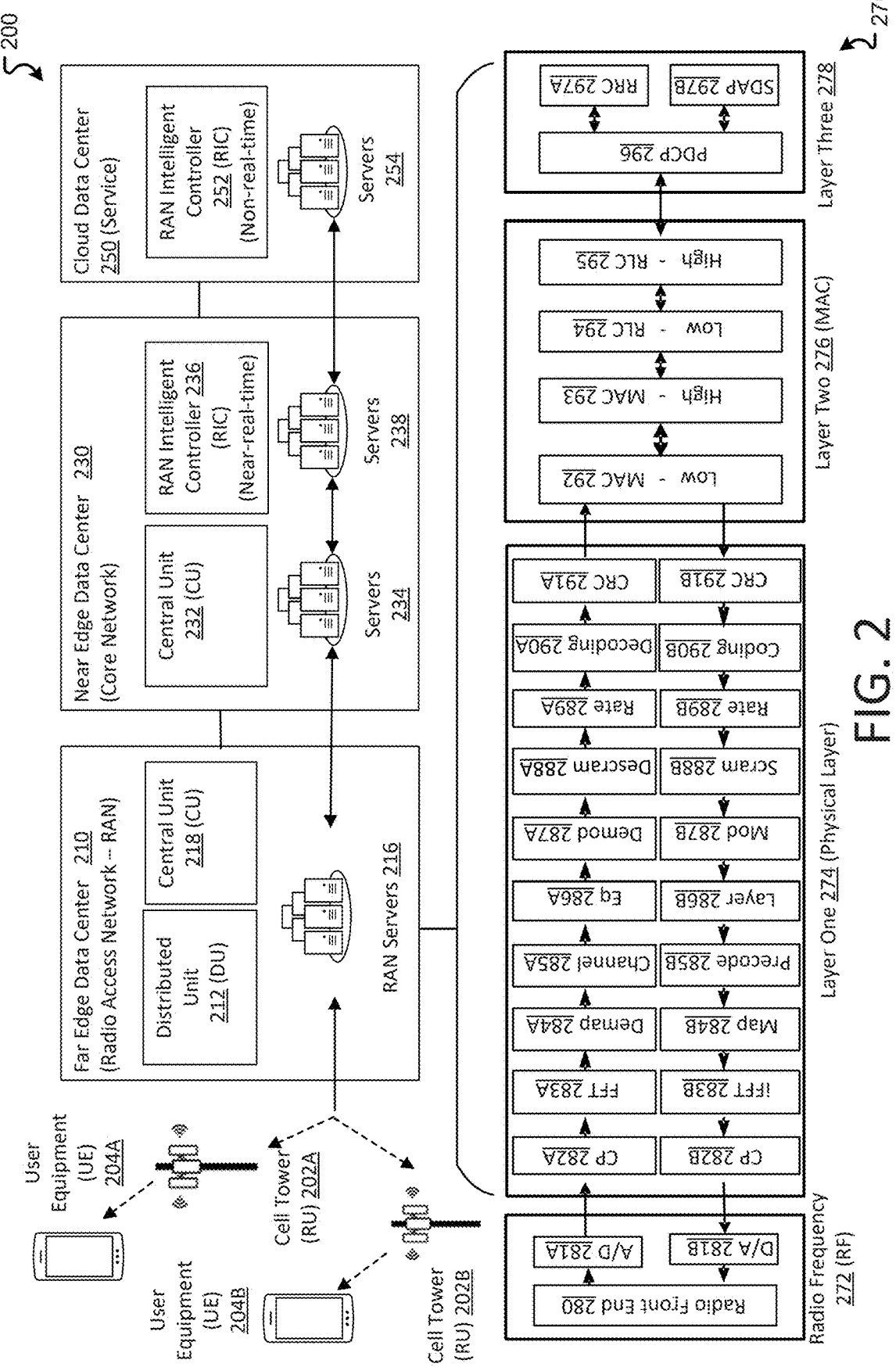
FIG. 2 illustrates an overview of an example system implementing a cloud RAN in accordance to aspects of the present disclosure.

FIG. 2 illustrates an overview of an example system 200 in which reference symbol transmission times may be determined in accordance with some aspects of the present disclosure. Cell towers 202A, 202B transmit and receive wireless communications with user equipment (UE) 204A, 204B (e.g., smartphones, computing devices with wireless connectivity, etc.), over a radio access network (RAN). The example system 200 further includes far-edge datacenter 210 (switches, RAN servers), near-edge datacenter 230 (core network servers), and cloud datacenter 250 (cloud services). In aspects, the example system 200 corresponds to a cloud RAN infrastructure for a mobile wireless telecommunication network.

The far-edge datacenter 210 is a datacenter that is part of the cloud RAN, which includes distributed unit 212 (DU) and central unit 218 (CU). In aspects, the far-edge datacenter 210 enables cloud integration with a radio access network (RAN). The far-edge datacenter 210 includes RAN servers 216. The RAN servers 216 process incoming data traffic and outgoing data traffic associated with layer one (the physical layer) 274 and at least a part of layer two (MAC) 276. In aspects, the far-edge datacenter 210 may be generally geographically remote from the cloud datacenters associated with the core network and cloud services. The remote site is in proximity to the cell towers 202A, 202B. For example, the proximity in the present disclosure may be within a few kilometers or more. In aspects, the upstream data traffic corresponds to data flowing from the cell towers 202A, 202B to servers 254 in the cloud datacenter 250 (service). Similarly, the downstream data traffic corresponds to data flowing from the cloud datacenter 250 (service) to the cell towers.

The near-edge datacenter 230 (e.g., hosting the core network) includes a central unit 232 (CU) and RAN intelligent controller 236 (RIC) (near real-time processing, which may be less strictly time-sensitive than real-time processing). As illustrated, CU 232 is associated with servers 234 and RIC 236 is associated with servers 238. In some aspects, the near-edge datacenter 230 is at a regional site of a private cloud service. For example, the regional site may be about tens of kilometers from the cell towers 202A, 202B.

The cloud datacenter 250 (service) includes RIC 252 (non-real-time processing) associated with servers 254. For example, RIC 252 processes non-real-time service operations. In aspects, the cloud datacenter 250 may be at a central location in a cloud RAN infrastructure. For example, the central locations may be hundreds of kilometers from the cell towers 202A, 202B.

In aspects, the far-edge datacenter 210, which is closer to the cell towers 202A, 202B than the cloud datacenter 250, provides real-time processing. In contrast, the cloud datacenter 250, which is the furthest from the cell towers 202A, 202B in the cloud RAN infrastructure, provides processing in a non-real-time manner.

The operational partitions 270 illustrate various operational segments for processing data traffic in the RAN. For example, the operational partitions 282-291 may correspond to layer one 274 processing and operational partitions 292-295 may correspond to layer two 276 processing of the OSI seven-layer model.

In aspects, conversion of data associated with a radio frequency 272 (RF) occurs prior to processing data at layer one 274. For radio frequency 272 (RF) data processing, the radio front-end partition receives and sends data through the cell towers 202A, 202B to the user equipment 204A, 204B (e.g., mobile computing devices) over wireless communications. The A/D 281A converts analog data from the radio front-end to digital data for the upstream data traffic. The D/A 281B converts digital data into analog data for the downstream data traffic. In aspects, the interface between DU and RU in a cloud RAN is referred to as "Fronthaul." The Fronthaul defines a number of "planes" of operations, including the "c-plane" (control plane), the "u-plane" (user plane), the "s-plane" (synchronization plane), and the "m-plane" (management plane). In general, c-plane data is directed to scheduling and coordination of data transmission, u-plane data is directed to efficient data transfer (e.g., defined by 5G specifications), s-plane data is directed to timing and synchronization of data transmission between RU and DU, and m-plane data relates to managing the RU. Packets having data payloads related to the different planes of operation comprise corresponding header information, e.g. a "c-plane header," "u-plane header," etc.

Partitions in layer one 274 (physical layer) may be associated with operations for converting coded symbols associated with a bit stream into a physical signal for transmission using communication media (e.g., a physical wire or radio). In aspects, the operational partitions for processing upstream data traffic of the physical layer may include, CP 282A, FFT 283A, Demap 284A, Channel 285A, Eq 286A, Demod 287A, Descram 288A, Rate 289A, Decoding 290A, and CRC 291A. The operational partitions for processing downstream data traffic in the physical layer may include, CRC 291B, Coding 290B, Rate 289B, Scram 288B, Mod 287B, Layer 286B, Precode 285B, Map 284B, iFFT 283B, and CP 282B.

Partitions in layer two 276 (media access control—MAC) may be associated with operations for transferring data frames between network hosts over a physical link. In aspects, partitions in layer two correspond to the data link layer in the OSI seven-layer model. Low-MAC 292 is the lowest partition in the layer two 276. Other partitions above the Low-MAC 292 include, an ascending sequence of layers, High-MAC 293, Low-Radio Link Control (RLC) 294, and High-RLC 295.

Partitions in the layer three 278 may be associated with operations for forwarding data packets through routers. In aspects, layer three 278 corresponds to the network layer in the OSI seven-layer model. The partitions in layer three 278 may be associated with protocol-governed operations such as Packet Data Convergence Protocol 296 (PDCP), Radio Resource Control 297A (RRC) and Service Data Adaptation Protocol 297B (SDAP).

In aspects, a combination of DU 212 and CU 218 in the far-edge datacenter 210 may process partitions associated with layer one 274, layer two 276, and at least a part of layer three 278. In particular, respective servers of RAN servers 216 include central processors (CPUs) and a variety of accelerators for processing data associated with one or more partitions of the operational partitions 270.

A shift away from specialized and monolithic network infrastructures towards programmable and virtualized RAN elements provides a unique opportunity to programmatically change/tune PHY control parameters (e.g., partitions 282A-

291B of layer one 274). Programmatically changing and/or tuning control parameters of the PHY can alter reference signal frequency and beamforming weights.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

Figure 3:
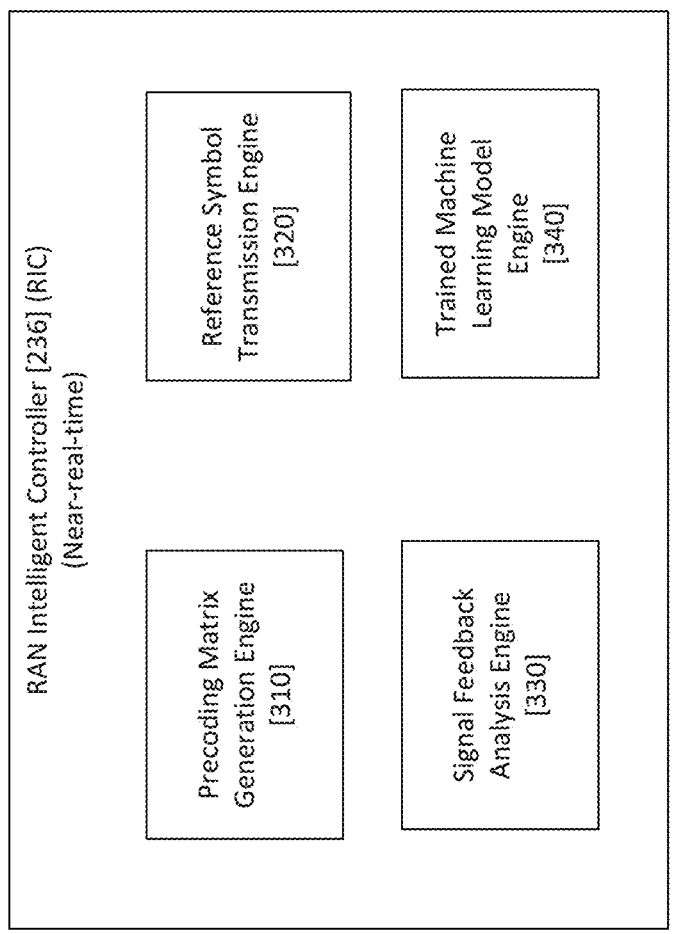
FIG. 3 illustrates a detailed schematic of a portion of the example system of FIG. 2.

FIG. 3 illustrates a detailed schematic of a portion of the example system 200 of FIG. 2. Specifically, FIG. 3 illustrates a schematic of the RAN intelligent controller (RIC) 236. The RIC 236 may include a precoding matrix generation engine or component 310, a reference symbol transmission engine or component 320, a signal feedback analysis engine or component 330, and/or a trained machine learning model engine or component 340. Additional and/or alternative components included by the RIC 236 may be recognized by those of ordinary skill in the art, in view of conventional RIC systems and/or in view of teachings disclosed herein.

The precoding matrix generation component 310 may contain (e.g., stored in a memory location corresponding to the precoding matrix generation component 310), and/or generate an indication of a precoding matrix for one or more UEs (e.g., UE 204A, 204B). The precoding matrix may be weighted to reduce interference of signal transmissions, such as signals that are being transmitted between one or more cell towers (e.g., RU 202A, 202B) and one or more UEs (e.g., UE 204A, 204B). Values within the precoding matrix may correspond to a strength with which one or more signals are transmitted to the one or more UEs.

In some examples, the weighting of the precoding matrix may be performed by a trained machine learning model (e.g., as discussed below with respect to the trained machine learning model component 340). The machine learning model may be trained to reduce, for a system (e.g., system 200), bandwidth overhead, compute time, and compute resources spent on channel estimation and feedback for a wireless communication channel (e.g., signals transmitted between the one or more cell towers 202A, 202B and the one or more UE 204A, 204B).

In some examples, the weighting of the precoding matrix may correspond to a stored value of a previously generated or estimated precoding matrix. In such examples, new beamforming weights may not be generated; rather, previously-generated beamforming weights may be used for channel estimation.

The reference symbol transmission component 320 may contain (e.g., stored in a memory location corresponding to the reference symbol transmission component 320), and/or generate an indication of a transmission time at which a reference symbol is transmitted. For example, a reference symbol may be transmitted to the one or more UEs 204A, 204B (e.g., wireless communication devices), via the one or more cell towers 202A, 202B. The transmission time that is stored and/or generated may be determined by a trained machine learning model (e.g., as discussed below with respect to the trained machine learning model component 340). The trained machine learning model may receive, as input, a vector based on signal feedback (e.g., as aggregated and/or generated by the signal feedback analysis component 330).

The trained machine learning model may be trained using contextual bandit learning. A reward of the contextual bandit learning may be a function of downlink throughput from a base station to a wireless communication device (e.g., UE 204A, 204B). For every frame of throughput, a reward may be calculated by the contextual bandit learning that is a function of downlink throughput and uplink overhead.

The function by which downlink throughput and uplink overhead are correlated or weighted, using the contextual bandit learning, may be based on a priority level of user equipment (e.g., UE 204A, 204B, which may be wireless communication devices). The priority level may correspond to economic or policy factors that are pre-determined for a client. For example, if an important client owns a particular user equipment, then that user equipment may be assigned a high priority level. In such an example, a relatively high downlink throughput may be desired, and a relatively high uplink overhead may be tolerated. In another example, a client that does not generate much revenue, or is relatively unimportant, may be assigned a low priority level. In such an example, uplink overhead may be relatively low, and a relatively low downlink throughput may be tolerated. In a further example, if an average client owns user equipment, then they may be assigned a medium priority level. In such an example, uplink overhead and downlink throughput may be relatively average, with respect to the high and low priority levels.

The signal feedback analysis component 330 may contain (e.g., stored in a memory location corresponding to the signal feedback analysis component 330), and/or generate an indication of a signal feedback based on a wireless communication channel between a wireless communication device and a base station. In some examples, the signal feedback may include one or more of uplink channel state information (CSI) for the wireless communication channel, a number of frames since a most-recent downlink CSI report for the wireless communication channel, and one or more downlink CSI reports for the wireless communication channel.

In some examples, the signal feedback further includes a signal noise measurement and/or a signal strength measurement. The signal feedback analysis component 330 may determine a signal to noise ratio (SNR) measurement, based on the signal noise measurement and the signal strength measurement. The signal feedback analysis component 330 may further determine a relative change in the channel state information, with respect to time, and/or a relative change in one or more downlink CSI reports, with respect to time. Additional and/or alternative signal feedback that may be received and/or determined based on the wireless communication channel may be recognized by those of ordinary skill in the art.

The indication of signal feedback generated by the signal feedback analysis component 330 may be a vector based on the signal feedback. For example, the vector may be an aggregation of information corresponding to the uplink CSI, the number of frames since the most-recent downlink CSI report, and the one or more downlink CSI reports. The vector may further aggregate information corresponding to the signal noise measurement, the signal strength measurement, and/or the signal to noise ratio measurement. The vector may further aggregate information corresponding to a change in the channel state information, with respect to time. Generally, the vector may be configurable to contain information corresponding to aspects of signal feedback that are desirable for precoding a matrix (e.g., via component 210) and/or for estimating a reference symbol transmission time (e.g., via component 220).

The trained machine learning model component 340 may contain (e.g., stored in a memory location corresponding to the trained machine learning model component 340), and/or generate a trained machine learning model. For example, the trained machine learning model may be used to determine a transmission time delay, after which a reference symbol may be transmitted. The trained machine learning model component 340 may receive input from the signal feedback analysis component 330. For example, the trained machine learning model component 340 may receive a vector of aggregated information corresponding to signal feedback.

The machine learning model may be trained to reduce, for a system (e.g., system 200), bandwidth overhead, compute time, and compute resources spent on channel estimation and feedback for a wireless communication channel (e.g., signals transmitted between the one or more cell towers 202A, 202B and the one or more UE 204A, 204B). The trained machine learning model may be trained using an online learning framework, such as, for example, via contextual bandit learning. The online learning framework may train the machine learning model using real time or near real time feedback, as opposed to other learning methods that may include training a machine learning model on a pre-prepared set of data. In some examples, a reward of the contextual bandit learning may be a function of downlink throughput from a base station to a wireless communication device (e.g., UE 204A, 204B). For every frame of throughput, a reward may be calculated by the contextual bandit learning that is a function of downlink throughput and uplink overhead.

The training of the machine learning model may include calculating a plurality of rewards for a respective plurality of transmission time delays. The plurality of rewards may each be calculated based on a function of downlink throughput and uplink overhead. The function of downlink throughput and uplink overhead may be based upon a priority level (as discussed further herein). The training may further include selecting a transmission time delay from the plurality of transmission time delays, wherein the selected transmission time delay has the greatest reward of the plurality of calculated rewards. The greatest reward may correspond to a preferred ratio of downlink throughput to uplink overhead.

In further examples, the machine learning model may be trained to select one or more types of beamforming to be used by systems disclosed herein (e.g., system 200). Mechanisms disclosed herein may change a type of beamforming, between a wireless communication device and the base station, based on the trained machine learning model. Some examples of beamforming types which may be determined, based on the machine learning model, include digital beamforming (e.g., beam weights are processed in baseband), analog beamforming (e.g., beam weights are processed in an analog or radio-frequency domain), or hybrid beamforming (a mix of both analog and digital beamforming). In some examples, the beamforming used herein may be one or more of Eigen-based beamforming, a grid of beams based on synchronization signal blocks (SSBs) and channel state information reference signals (CSI-RS) beams, and a grid of beams based on a precoding matrix indicator (PMI).

The Eigen-based beamforming may be used when it is desired for beams to be positioned with precision, because Eigen-based beamforming may allow for beams to be positioned at any of an infinite number of locations (e.g., as compared to a discrete number of location options). The grid of beams based on SSBs and CSI-RS may be used when it is desired for one or more SSBs to be covered by a plurality of (e.g., four) CSI-RS beams to refine beam strength in specific regions. The grid of beams based on a PMI may be used when it is acceptable for beams to be positioned at one of a plurality of pre-defined discrete regions (e.g., circles on a grid) and/or when it is desired to reduce computational resources to process beamforming.

Figure 4:
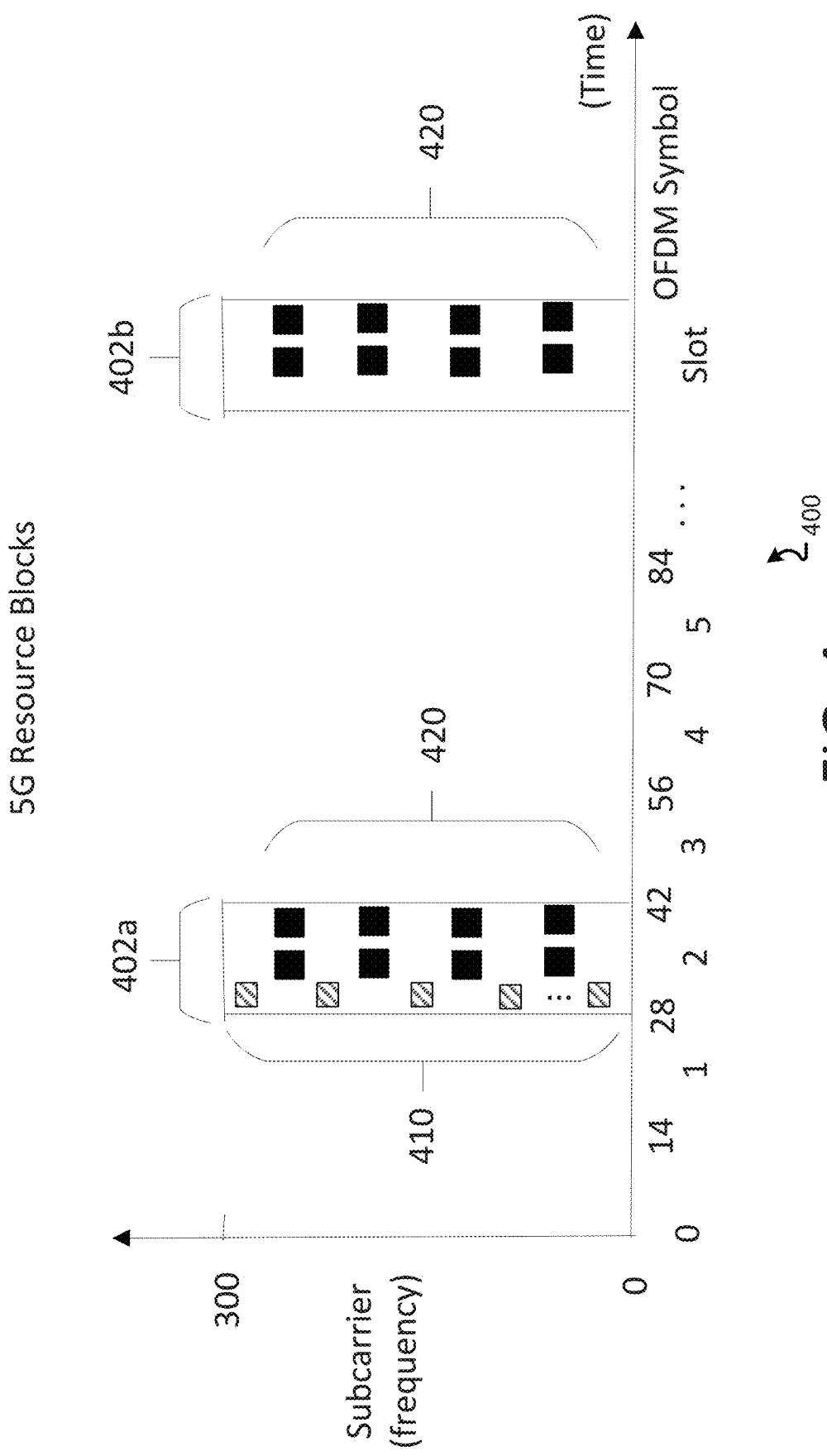
FIG. 4 illustrates an example time diagram in accordance with some aspects of the present disclosure.

FIG. 4 illustrates an example time diagram 400 in accordance with some aspects of the present disclosure. The time diagram 400 is a plot of subcarrier frequencies with respect to time. As shown in the time diagram 400, for 5G resource blocks, 1 slot typically equates to 14 orthogonal frequency-division multiplexing (OFDM) symbols. Furthermore, one frame typically equates to about 10 slots.

The time diagram 400 includes one or more slots, such as a first slot 402a and a second slot 402b. The first slot 402a includes a plurality of reference symbols 410 and a plurality of pilot symbols 420, with remaining resource units being used for data symbols (not shown). The components described earlier herein (e.g., components 310, 320, 330) may determine whether or not a reference symbol (e.g., reference symbols 410) will be sent at a given time. Additional, or alternative, mechanisms disclosed herein may determine a time at which the reference symbols (e.g., reference symbols 410) are transmitted (e.g., from a base station to user equipment).

The second slot 402b occurs at a different time than the first slot 402a. At the second slot 402b, mechanisms disclosed herein determined that reference symbols (e.g., reference symbols 410) would not be transmitted. Accordingly, the reference symbols (e.g., scheduled or periodic reference symbols) are omitted in the time diagram 400 for the second slot 402b, while the plurality of pilot signals 420 and data symbols are included. With the scheduled reference symbols omitted, additional resource units may be used for data symbols, improving uplink bandwidth.

Generally, systems and methods disclosed herein relate to determining reference symbol transmission times (e.g., determining whether or not a reference symbol is transmitted at a given time and/or determining a transmission time delay). Advantages of the systems and methods disclosed may include reducing an overhead of bandwidth, time, and compute resources spend on channel estimation and feedback, while not negatively affection a system's downlink throughput.

Figure 5:
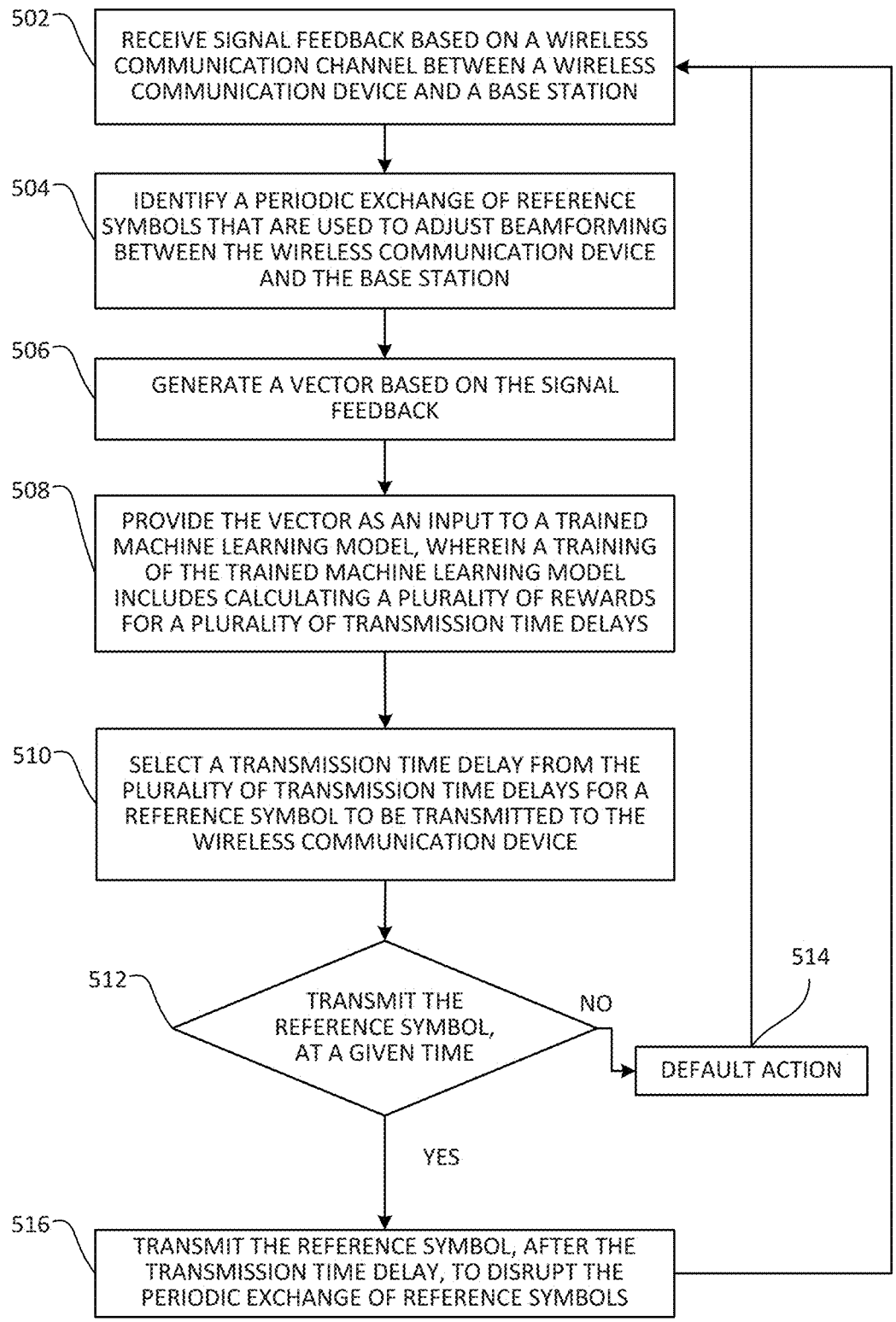
FIG. 5 illustrates an example method of determining reference symbol transmission times.

FIG. 5 illustrates an example method 500 of determining reference symbol transmission times, such as, for example, for cellular communications (e.g., 5G). A general order of the operations for the method 500 is shown in FIG. 5. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 2-4, 7, and 8A-B. For example, aspects of method 500 may be performed by a near-real-time RAN Intelligent Controller (RIC), such as RIC 236 of FIGS. 2 and 3.

At operation 502, signal feedback may be received based on a wireless communication channel between one or more wireless communication devices (e.g., UE 204A, 204B) and one or more base stations (e.g., RU 202A, 202B). The signal feedback may be analyzed, for example by the signal feedback analysis component 330 discussed earlier herein with respect to FIG. 3.

The signal feedback may include one or more of uplink channel state information (CSI) for the wireless communication channel, a number of frame since a most-recent downlink CSI report for the wireless communication channel, and one or more downlink CSI reports for the wireless communication channel. The signal feedback may further include a signal noise measurement, a signal strength measurement, and a signal to noise ratio (SNR) measurement that is based on the signal noise measurement and the signal strength measurement. The signal feedback may indicate a relative change in the one or more downlink CSI reports, with respect to time, and/or a change in the CSI, with respect to time. Generally, the signal feedback may include or provide an indication of information corresponding to one or more wireless communication channels, derivatives of such information, and/or calculations incorporating such information.

In some examples, the signal feedback may be a plurality of signal feedbacks. In some aspects in accordance with the present disclosure, there may be a plurality of wireless communication devices and a plurality of base stations. In such examples, the signal feedback may incorporate some, or all, of the wireless communication channels between the plurality of wireless communication devices and the plurality of base stations.

At operation 504, a periodic exchange of reference symbols that are used to adjust beamforming between the wireless communication device and the base station may be identified. For example, a reference symbol may be sent every frame (which may be about 10 milliseconds). Alternatively, a reference symbol may be sent at some other standard frequency of time. Mechanisms disclosed herein may allow for a transmission time of reference symbols to be delayed to disrupt the periodic exchange of reference symbols. Accordingly, a bandwidth of wireless communication channels may be improved to transmit user data, during the transmission time delay, because there is more bandwidth available to transmit user data, instead of reference symbols.

At operation 506, a vector may be generated based on the signal feedback received at the operation 502. The vector may be an aggregation of one or more of the uplink CSI, the number of frames since the most-recent downlink CSI report, and the one or more downlink CSI reports. The vector may further aggregate the signal noise measurement, the signal strength measurement, and the signal to noise ratio. The vector may further aggregate the change in the one or more downlink CSI reports, with respect to time, and/or the change in the channel state information, with respect to time.

The vector may be normalized to increase cohesion across varied measurements or information states. Further, in some examples, the vector may be altered, via arithmetic, to weight one or more aspects of signal feedback high or lower than other aspects of signal feedback. Further, in some examples, the vector may be cleaned to eliminate measurements or information states that are determined to be outliers.

At operation 508, the vector may be provided as an input to a trained machine learning model. The trained machine learning model may be stored and/or generated by the trained machine learning model component 340, discussed earlier herein with respect to FIG. 3. The trained machine learning model may be trained using an online learning framework, such as, for example, via contextual bandit learning. The online learning framework may train the machine learning model using real time or near real time feedback, as opposed to other learning methods that may include training a machine learning model on a pre-prepared set of data. A reward in the training of the machine learning model, using contextual bandit learning, may be a function of downlink throughput from the base station to the wireless communication device and uplink overhead of the signal feedback from the wireless communication device to the base station.

The training of the machine learning model may include calculating a plurality of rewards for a respective plurality of transmission time delays. The plurality of rewards may each be calculated based on a function of downlink throughput and uplink overhead. The function of downlink throughput and uplink overhead may be based upon a priority level (as discussed further herein). The training may further include selecting a transmission time delay from the plurality of transmission time delays, wherein the selected transmission time delay has the greatest reward of the plurality of calculated rewards. The greatest reward may correspond to a preferred ratio of downlink throughput to uplink overhead. The function of the downlink throughput and uplink overhead may be weighted for the wireless communication device, based on a priority level of the wireless communication device. The priority level may correspond to economic or policy factors that are pre-determined for a client (e.g., corresponding to user equipment, such as user equipment 204A, 204B). For example, if an important client owns user equipment, then the client and/or their user equipment may be assigned a high priority level. In such an example, downlink throughput may be relatively high, and a relatively high uplink overhead may be tolerated. Therefore, based on a vector indicating relatively average downlink throughput and relatively average uplink overhead, mechanisms disclosed herein may select an Eigen-based beamforming technique in which beams are positioned with precision to increase downlink throughput, even though such a technique may increase uplink overhead.

In another example, a client that does not generate much revenue, or is relatively unimportant, may be assigned a low priority level. In such an example, uplink overhead may be relatively low, and a relatively low downlink throughput may be tolerated. Therefore, based on a vector indicating relatively average downlink throughput and relatively high uplink overhead, mechanisms disclosed herein may select a grid of beams based on PMI beamforming technique, in which beams intensities and locations correspond to a pre-determined precoding matrix indicator. Accordingly, uplink overhead may be reduced, while a decrease in downlink throughput may be tolerated, as compared to, for example, more precise Eigen-based beamforming techniques.

In a further example, if an average client owns user equipment, then they may be assigned a medium priority level. In such an example, uplink overhead and downlink throughput may be relatively average, with respect to the high and low priority levels. Therefore, based on a vector indicating relatively average uplink overhead and low downlink throughput, mechanisms disclosed herein may select a grid of beams based on SSBs and CSI-RS beamforming technique in which relative larger SSB beams are strengthened by CSI-RS beams that are relatively more refined. Generally, priority levels may be used to determine weighting of the function on which the machine learning model is trained using contextual bandit learning. Furthermore, the priority levels may impact a selection of which beamforming technique may be used for channel transmissions. While a few examples have been provided herein for selecting beamforming techniques based on vector aggregations of signal feedback, further examples should be recognized by those of ordinary skill in the art, at least in light of teachings disclosed herein and/or experimentation using such teachings.

Furthermore, it should be recognized by those of ordinary skill in the art that additional and/or alternative methods of algorithmic training may be used to train the machine learning model. For example, the machine learning model may be supervised, semi-supervised, unsupervised, and/or a reinforcement model. More specifically, the machine learning model may be a neural network, a linear regression model, and/or a classification model, which are trained using conventional techniques.

At operation 510, a transmission time delay for a reference symbol to be transmitted to the wireless communication device may be selected from the plurality of transmission time delays calculated by the trained machine learning model. For example, a system without a transmission time delay may transmit a reference symbol every 10 milliseconds. Accordingly, the trained machine learning model may determine by how much time a reference symbol transmission may be delayed, such that other useful data (e.g., user data) can be transmitted. The machine learning model may determine a reward (e.g., the function of downlink throughput and uplink overhead discussed earlier herein) based on how long a reference symbol has last been transmitted. If downlink throughput is decreasing (e.g., user equipment has moved locations, and a location of beamforming has not been adjusted), then mechanisms disclosed herein may determine (e.g., based on, during training, a relatively high reward for doing so) that a reference symbol should be transmitted (e.g., by selecting a relatively small, if any, transmission time delay) for beamforming techniques disclosed herein to be reconfigured. The transmission time delay may be the amount of time that a reference symbol is not transmitted, relative to a standard transmission frequency (e.g., 10 ms). In some examples, instances at which reference symbols are transmitted may depend upon the trained machine learning model. Additionally, or alternatively, the instances at which reference symbols are transmitted may depend upon the priority level with which a wireless communication device is assigned, as discussed above.

At determination 512, it may be determined if the reference symbol is transmitted at a given time. For example, determination 512 may include comparing a given or current time to the transmission time delay determined at operation 510. Additionally, or alternatively, determination 512 may include comparing a given or current time to an indication corresponding to the transmission time delay determined at operation 510 (e.g., how much time has passed since a previous reference symbol was transmitted).

If it is determined that the reference symbol is not to be transmitted at the given time, flow branches "NO" to operation 514, where a default action is performed. For example, the reference symbol and/or the determined transmission time may have an associated pre-configured action. In other examples, method 500 may comprise determining whether reference symbol and/or the determined transmission time has an associated default action, such that, in some instances, no action may be performed at the given time. Alternatively, in some instances, a transmission of a scheduled reference symbol may be omitted, based on the determined transmission time delay. Method 500 may terminate at operation 514. Alternatively, method 500 may return to operation 502 to provide an iterative loop of receiving signal feedback and determining whether or not to transmit a reference symbol at a given time.

In some examples, if a reference symbol is not transmitted (e.g., when flow branches "NO" to operation 514), a precoding matrix may be generated based on a previously generated precoding matrix. For example, a precoding matrix may have previously been generated at operation 610 of method 600, as will be discussed in further detail below. Alternatively, systems disclosed herein may include predetermined or stored precoding matrices, such that generating a precoding matrix based on a previously generated precoding matrix may include selecting a precoding matrix from a plurality of pre-defined precoding matrices that are stored (e.g., in memory).

If however, it is determined that the reference symbol is to be transmitted at the given time, flow instead branches "YES" to operation 516, wherein the reference symbol is transmitted, after the transmission time delay. In such instances, a time at which a previous reference symbol was transmitted may be equal to the determined transmission time delay being subtracted from the given time of determination 512. Alternatively, another calculation may be performed based on the given time and the determined transmission time delay to indicate that the reference symbol is to be transmitted. The reference symbol is transmitted after the transmission time delay to disrupt the period exchange of reference symbols. Therefore, bandwidth of the wireless communication channel is improved to transmit user data, during the transmission time delay, because bandwidth is available to transmit user data that would otherwise be occupied by reference symbols.

In some examples, operation 516 may further include determining whether to send a Type I or Type II CSI feedback report. It may be pre-defined for a system whether to send the Type I or Type II CSI feedback report. Alternatively, the determination of which CSI feedback report to send may be based on downlink throughput and uplink overhead. For example, the Type II CSI feedback report (e.g., which may include eigenvectors of a downlink CSI, etc.) is more detailed than the Type I CSI feedback report. Therefore, it may be undesirable to send the Type II CSI feedback report in instances in instances where downlink throughput needs to be decreased. Rather, it may be desirable to send Type I CSI feedback reports, as compared to Type II CSI feedback reports, in instances where downlink throughput needs to be decreased.

Method 500 may terminate at operation 516. Alternatively, method 500 may return to operation 502 to provide an iterative loop of receiving signal feedback and transmitting reference symbols, after a determined transmission time delay.

Figure 6:
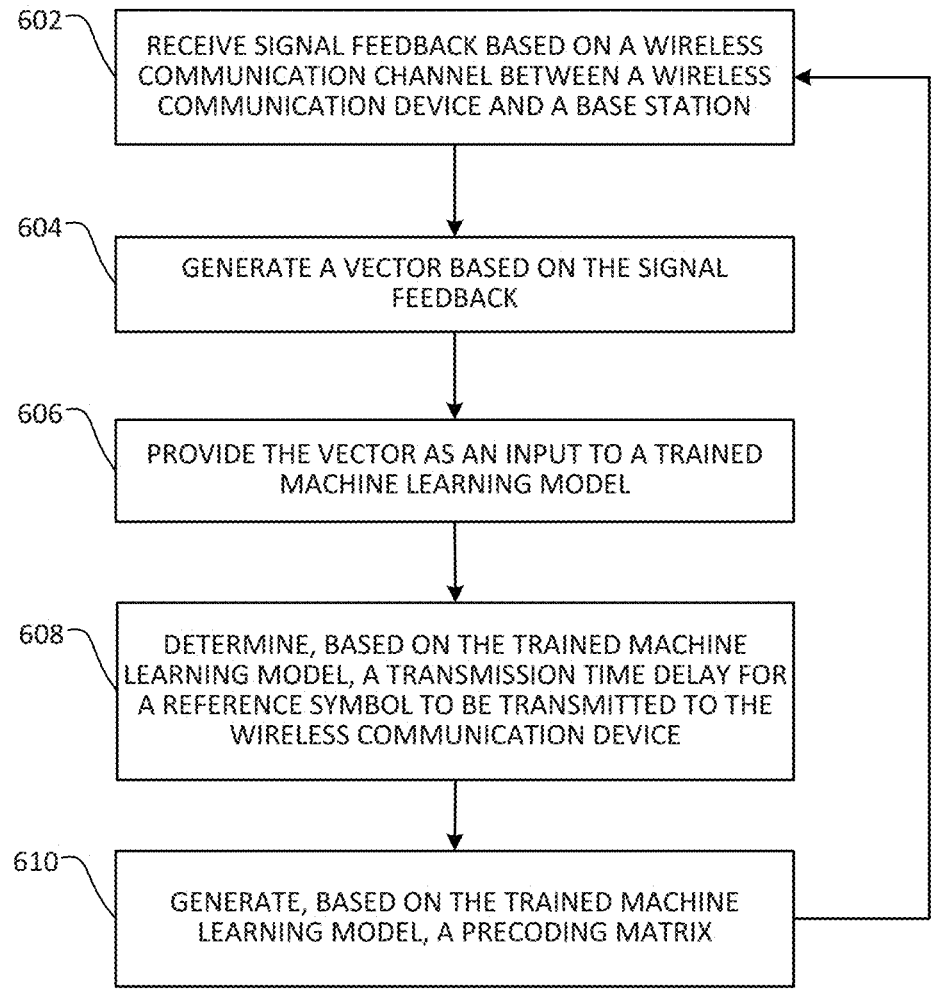
FIG. 6 illustrates an example method of generating a precoding matrix.

FIG. 6 illustrates an example method 600 of generating a precoding matrix. A general order of the operations for the method 600 is shown in FIG. 6. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 2-5, 7, and 8A-B. For example, aspects of method 600 may be performed by a near-real-time RAN Intelligent Controller (RIC), such as RIC 236 of FIGS. 2 and 3.

At operation 602, signal feedback may be received based on a wireless communication channel between one or more wireless communication devices (e.g., UE 204A, 204B) and one or more base stations (e.g., RU 202A, 202B). The signal feedback may be analyzed, for example by the signal feedback analysis component 330 discussed earlier herein with respect to FIG. 3.

The signal feedback may include one or more of uplink channel state information (CSI) for the wireless communication channel, a number of frame since a most-recent downlink CSI report for the wireless communication channel, and one or more downlink CSI reports for the wireless communication channel. The signal feedback may further include a signal noise measurement, a signal strength measurement, and a signal to noise ratio (SNR) measurement that is based on the signal noise measurement and the signal strength measurement. The signal feedback may indicate a relative change in the one or more downlink CSI reports, with respect to time, and/or a change in the CSI, with respect to time. Generally, the signal feedback may include or provide an indication of information corresponding to one or more wireless communication channels, derivatives of such information, and/or calculations incorporating such information.

In some examples, the signal feedback may be a plurality of signal feedbacks. In some aspects in accordance with the present disclosure, there may be a plurality of wireless communication devices and a plurality of base stations. In such examples, the signal feedback may incorporate some, or all, of the wireless communication channels between the plurality of wireless communication devices and the plurality of base stations.

At operation 604, a vector may be generated based on the signal feedback received at the operation 602. The vector may be an aggregation of one or more of the uplink CSI, the number of frames since the most-recent downlink CSI report, and the one or more downlink CSI reports. The vector may further aggregate the signal noise measurement, the signal strength measurement, and the signal to noise ratio. The vector may further aggregate the change in the one or more downlink CSI reports, with respect to time, and/or the change in the channel state information, with respect to time.

The vector may be normalized to increase cohesion across varied measurements or information states. Further, in some examples, the vector may be altered, via arithmetic, to weight one or more aspects of signal feedback high or lower than other aspects of signal feedback. Further, in some examples, the vector may be cleaned to eliminate measurements or information states that are determined to be outliers.

At operation 606, the vector may be provided as an input to a trained machine learning model. The trained machine learning model may be stored and/or generated by the trained machine learning model component 340, discussed earlier herein with respect to FIG. 3. The trained machine learning model may be trained using an online learning framework, such as, for example, via contextual bandit learning. The online learning framework may train the machine learning model using real time or near real time feedback, as opposed to other learning methods that may include training a machine learning model on a pre-prepared set of data. A reward in the training of the machine learning model, using contextual bandit learning, may be a function of downlink throughput from the base station to the wireless communication device and uplink overhead of the signal feedback from the wireless communication device to the base station.

The training of the machine learning model may include calculating a plurality of rewards for a respective plurality of transmission time delays. The plurality of rewards may each be calculated based on a function of downlink throughput and uplink overhead. The function of downlink throughput and uplink overhead may be based upon a priority level (as discussed further herein). The training may further include selecting a transmission time delay from the plurality of transmission time delays, wherein the selected transmission time delay has the greatest reward of the plurality of calculated rewards. The greatest reward may correspond to a preferred ratio of downlink throughput to uplink overhead.

The function of the downlink throughput and uplink overhead may be weighted for the wireless communication device, based on a priority level of the wireless communication device. The priority level may correspond to economic or policy factors that are pre-determined for a client (e.g., corresponding to user equipment, such as user equipment 204A, 204B). For example, if an important client owns user equipment, then the client and/or their user equipment may be assigned a high priority level. In such an example, downlink throughput may be relatively high, and a relatively high uplink overhead may be tolerated. In another example, a client that does not generate much revenue, or is relatively unimportant, may be assigned a low priority level. In such an example, uplink overhead may be relatively low, and a relatively low downlink throughput may be tolerated. In a further example, if an average client owns user equipment, then they may be assigned a medium priority level. In such an example, uplink overhead and downlink throughput may be relatively average, with respect to the high and low priority levels. Generally, priority levels may be used to determine weighting of the function on which the machine learning model is trained using contextual bandit learning.

It should be recognized by those of ordinary skill in the art that additional and/or alternative methods of algorithmic training may be used to train the machine learning model. For example, the machine learning model may be supervised, semi-supervised, unsupervised, and/or a reinforcement model. More specifically, the machine learning model may be a neural network, a linear regression model, and/or a classification model, which are trained using conventional techniques.

In some examples or aspects, the method 600 may further include an operation 608, at which a transmission time delay for a reference symbol to be transmitted to the wireless communication device may be determined, based on the trained machine learning model. In some examples, instances at which reference symbols are transmitted may depend upon the trained machine learning model. Additionally, or alternatively, the instances at which reference symbols are transmitted may depend upon the priority level with which a wireless communication device is assigned, as discussed above.

At operation 610, a precoding matrix is generated, based on the trained machine learning model. The precoding matrix may be generated to reduce, for a system, bandwidth overhead spent on channel estimation and/or feedback for the wireless communication channel. The precoding matrix may further be generated to reduce, for the system, real-time compute time spent on channel estimation and/or feedback for the wireless communication channel. Still further, the precoding matrix may be generated to reduce, for the system, compute resources spent on channel estimation and feedback for the wireless communication channel. For example, by preprocessing a system to generate a precoding matrix, according to aspects disclosed herein, it may not be necessary to transmit reference symbols at a relatively high frequency and determine precoding matrices therefrom, as may demand relatively high bandwidth overhead, real-time compute time, and compute resources. Rather, a precoding matrix can be estimated based upon the trained machine learning model, delays can be implemented between reference symbol transmission, and real-time processing can thereby be reduced.

The precoding matrix may be generated based on the same trained machine learning model that determined the transmission time of operation 608. Alternatively, the precoding matrix may be generated based on a second trained machine learning model that is trained to dynamically adjust beamforming weights to reduce an overhead of bandwidth, time, and compute resources spent on channel estimation and feedback, while not negatively affecting a system's downlink throughput.

The precoding matrix generated at operation 610 may be reused by mechanisms disclosed herein (e.g., in scenarios where beamforming weights do not need to be adjusted, or where mechanisms disclosed herein determine that beamforming weights will not be adjusted, based on determined priorities). Accordingly, in some examples, method 600 may include generating a precoding matrix based on a previously generated, stored, and/or determined precoding matrix. Alternatively, a new precoding matrix may be generated at operation 610 between transmissions of reference symbols.

Method 600 may terminate at operation 610. Alternatively, method 600 may return to operation 602 to provide an iterative loop of receiving signal feedback, optionally transmitting reference symbols at determined transmission times, and generating estimated precoding matrices, for example, to adjust beamforming weights.

Figure 7:
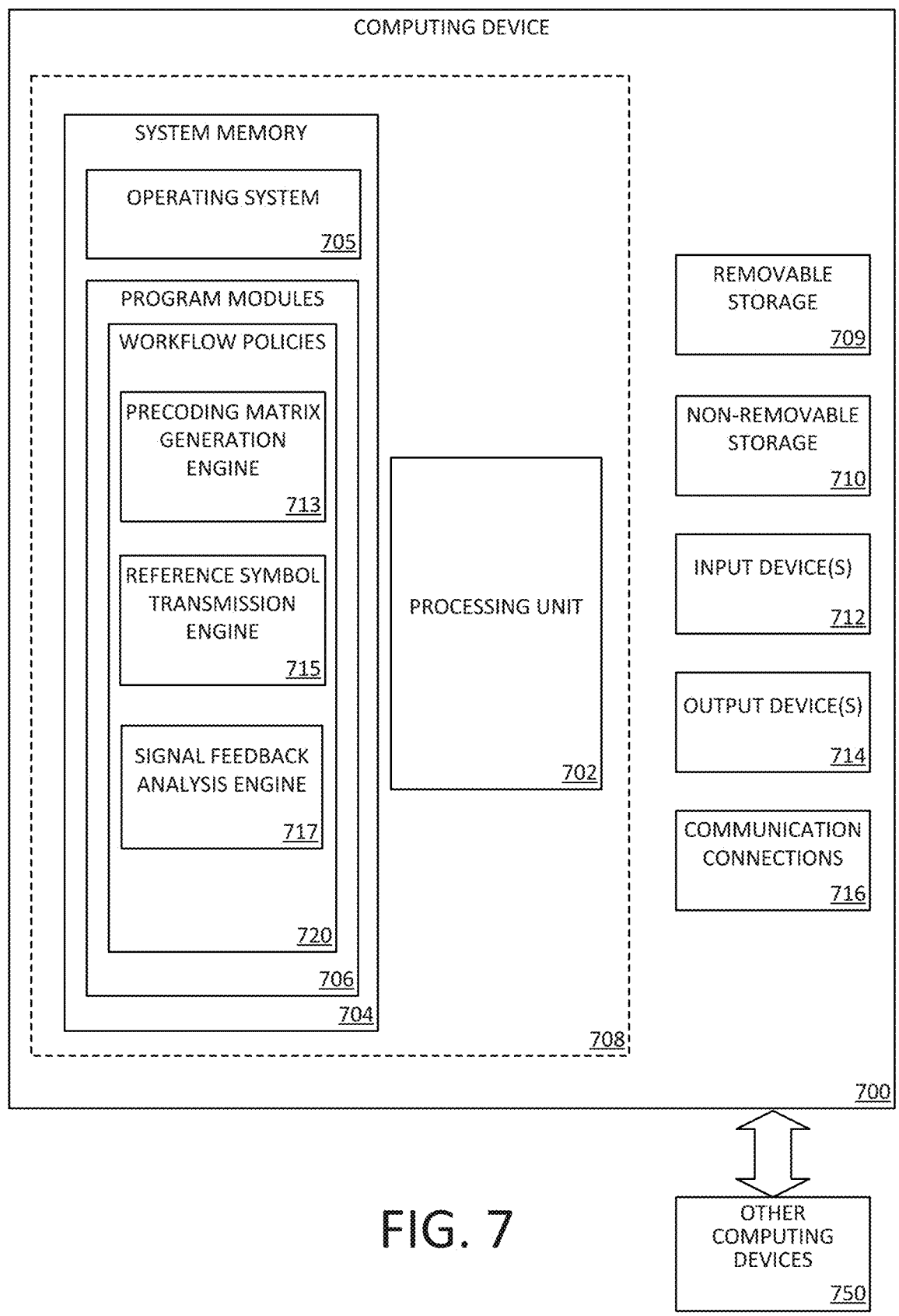
FIG. 7 is a block diagram illustrating example physical components of a computing device with which aspects of the disclosure may be practiced.

FIG. 7 is a block diagram illustrating physical components (e.g., hardware) of a computing device 700 (e.g., a programmable switch) with which aspects of the disclosure may be practiced. The computing device components described below may have computer executable instructions for implementing workflow policies 720 on a computing device (e.g., switch 114), including computer executable instructions for the workflow policies 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running workflow policies 720, such as one or more components and, in particular, precoding matrix generation engine or component 713, reference symbol transmission engine or component 715, and signal feedback analysis engine or component 717. The precoding matrix generation component 713, the reference symbol transmission component 715, and the signal feedback analysis engine 717 may be similar to the precoding generation component 310, the reference symbol transmission component 320, and the signal feedback analysis engine 330, respectively, and discussed earlier herein with respect to FIG. 3.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., workflow policies 720) may perform processes including, but not limited to, the aspects, as described herein. Other program modules that may be used in accordance with aspects of the present disclosure, and in particular for determining reference symbol transmission times, may include precoding matrix generation engine or component 713, reference symbol transmission engine or component 715, and signal feedback analysis engine or component 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
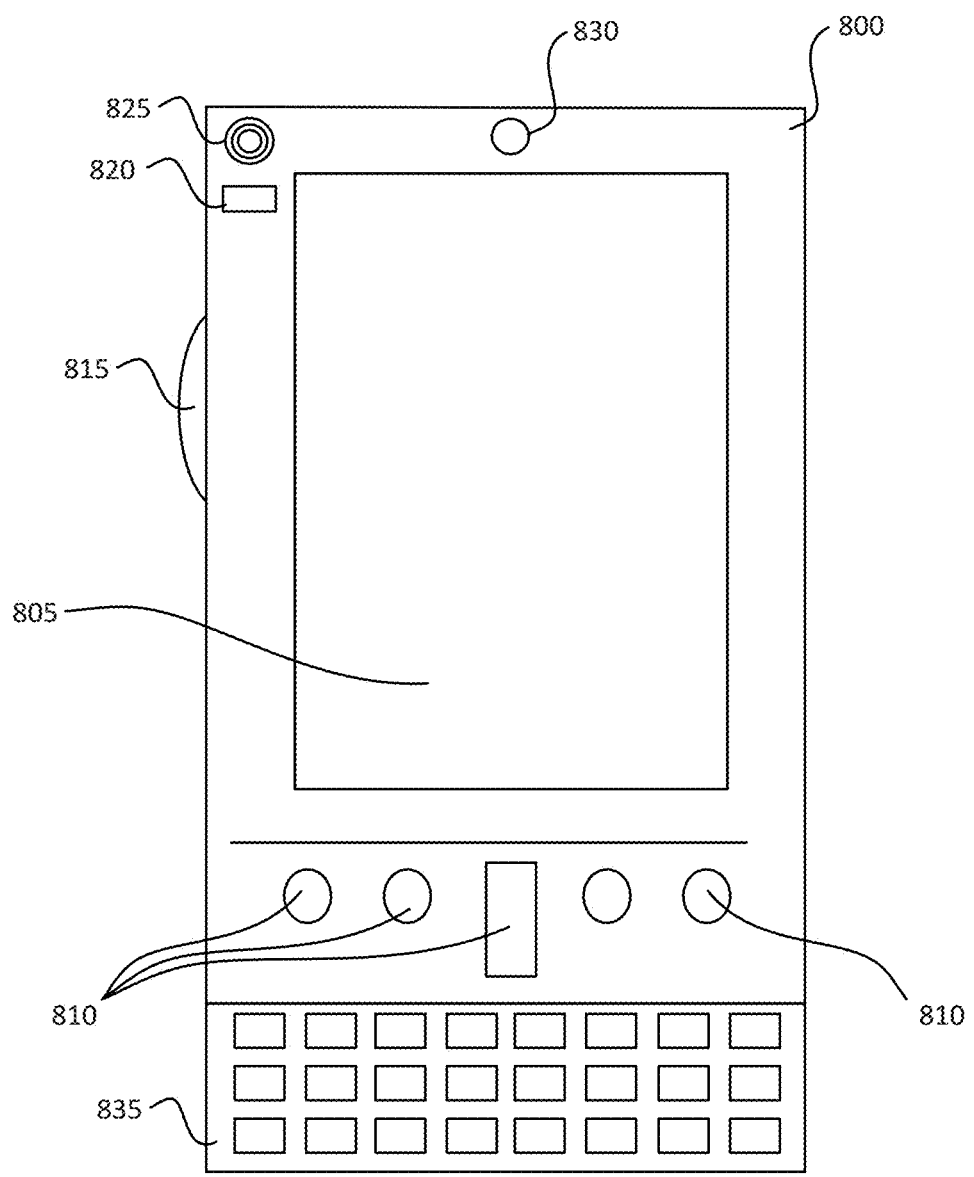
FIG. 8A is a simplified diagram of a mobile computing device with which aspects of the present disclosure may be practiced.
Figure 8B:
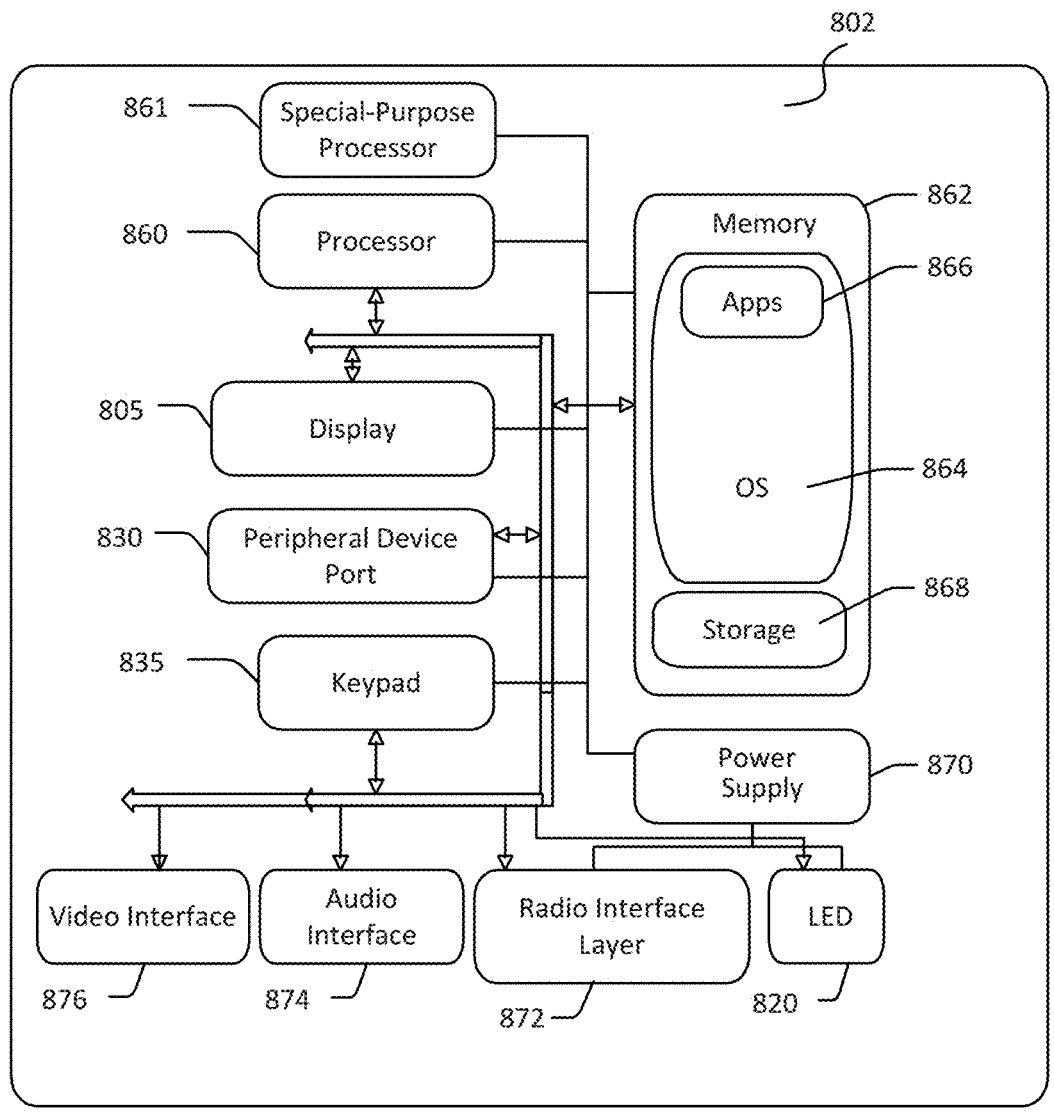
FIG. 8B is another simplified block diagram of a mobile computing device with which aspects of the present disclosure may be practiced.

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for implementing workflow policies as described herein (e.g., traffic/resource monitor, precoding matrix generation engine or component, reference symbol transmission engine or component, and signal feedback analysis engine or component, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device 830 (e.g., on-board camera) to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

As should be appreciated, FIGS. 8A and 8B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for determining reference symbol transmission times according to at least the examples provided in the sections below.

In an aspect, a method is provided. The method includes receiving signal feedback based on a wireless communication channel between a wireless communication device and a base station, identifying a periodic exchange of reference symbols that are used to adjust beamforming between the wireless communication device and the base station, generating a vector based on the signal feedback, and providing the vector as an input to a trained machine learning model. A training of the trained machine learning model includes calculating a plurality of rewards for a respective plurality of transmission time delays. The plurality of rewards are each calculated based on a function of downlink throughput and uplink overhead, the function of downlink throughput and uplink overhead is based upon a priority level of the wireless communication device. The method further includes selecting a transmission time delay from the plurality of transmission time delays for a reference symbol to be transmitted to the wireless communication device. The selected transmission time delay has the greatest reward of the plurality of calculated rewards. The method further includes transmitting the reference symbol, after the transmission time delay, to disrupt the periodic exchange of reference symbols.

In another aspect, a system is provided. The system includes at least one processor and memory storing instructions that, when executed by the at least one processor, cause the system to perform a set of operations. The set of operations include: receive signal feedback based on a wireless communication channel between a wireless communication device and a base station, identify a periodic exchange of reference symbols that are used to adjust beamforming between the wireless communication device and the base station, generate a vector based on the signal feedback, and provide the vector as an input to a trained machine learning model. A training of the trained machine learning model includes calculating a plurality of rewards for a respective plurality of transmission time delays. The plurality of rewards are each calculated based on a function of downlink throughput and uplink overhead based upon a priority level of the wireless communication device. The set of operations further include: select a transmission time delay from the plurality of transmission time delays for a reference symbol to be transmitted to the wireless communication device, wherein the selected transmission time delay has the greatest reward of the plurality of calculated rewards, and transmit the reference symbol, after the transmission time delay, to disrupt the periodic exchange of reference symbols.

In another aspect, a method for generating a precoding matrix is provided. The method includes receiving signal feedback based on a wireless communication channel between a wireless communication device and a base station, generating a vector based on the signal feedback, providing the vector as an input to a trained machine learning model, and generating, based on the trained machine learning model, a precoding matrix.

In some aspects, bandwidth of the wireless communication channel is improved to transmit user data, during the transmission time delay.

In some aspects, the signal feedback includes one or more of uplink channel state information (CSI) for the wireless communication channel, a number of frames since a most-recent downlink CSI report for the wireless communication channel, or one or more downlink CSI reports for the wireless communication channel.

In some aspects, the signal feedback indicates a relative change in the one or more downlink CSI reports, with respect to time, and a relative change in the uplink CSI, with respect to time.

In some aspects, the signal feedback is received from one or more of the wireless communication device, a distributed unit (DU), and a central unit (CU).

In some aspects, the vector is an aggregation of the uplink CSI, the number of frame since the most-recent downlink CSI report, and the one or more downlink CSI reports.

In some aspects, a type of beamforming is changed, between the wireless communication device and the base station, based on the trained machine learning model.

In some aspects, the trained machine learning model is trained using contextual bandit learning, wherein the plurality of rewards are functions of downlink throughput from the base station to the wireless communication device and uplink overhead of the signal feedback from the wireless communication device to the base station.

In some aspects, the greatest reward is a weighted function of downlink throughput and uplink overhead for the wireless communication device based on the priority level of the wireless communication device.

In some aspects, an estimated precoding matrix is generated, based on the trained machine learning model.

In some aspects, the precoding matrix is generated to reduce, for a system, bandwidth overhead, compute time, and compute resources spent on channel estimation and feedback for the wireless communication channel.

In some aspects, generating the precoding matrix comprises generating the precoding matrix based on a previously generated precoding matrix.

In some aspects, a periodic exchange of reference symbols that are used to adjust beamforming between the wireless communication device and the base station is identified, a transmission time delay for a reference symbol to be transmitted to the wireless communication device is determined, based on the trained machine learning model, and the reference symbol is transmitted, after the transmission time delay, to disrupt the periodic exchange of reference symbols.

Any of the one or more above aspects in combination with any other of the one or more aspect. Any of the one or more aspects as described herein.

What is claimed is:

1. A method of determining reference symbol transmission times for cellular communications, the method comprising:
    receiving signal feedback for a wireless communication channel between a wireless communication device and a base station;
    identifying a periodic exchange of reference symbols that are used to adjust beamforming between the wireless communication device and the base station;
    generating a vector based on the signal feedback;
    providing the vector as an input to a trained machine learning model, wherein a training of the trained machine learning model comprises:
        receiving a plurality of signal feedbacks for the wireless communication channel, each signal feedback corresponding to a respective frame of time, and each signal feedback of the plurality of signal feedbacks including a respective downlink throughput and uplink overhead;
        selecting a plurality of transmission time delays for reference symbols, each transmission time delay of the plurality of transmission time delays being selected based on a respective signal feedback of the plurality of signal feedbacks; and
        calculating a plurality of rewards, each reward of the plurality of rewards being calculated for a respective transmission time delay of the plurality of transmission time delays, the plurality of rewards each being calculated based on a change in downlink throughput between consecutive signal feedbacks of the plurality of signal feedbacks and a change in uplink overhead between consecutive signal feedbacks of the plurality of signal feedbacks, and at least one of the change in downlink throughput and the change in uplink overhead being weighted based upon a priority level of the wireless communication device;
    selecting a transmission time delay from the plurality of transmission time delays for a reference symbol to be transmitted to the wireless communication device, the selected transmission time delay having the greatest reward of the plurality of calculated rewards; and
    transmitting the reference symbol, after the transmission time delay, to disrupt the periodic exchange of reference symbols.

2. The method of claim 1, wherein bandwidth of the wireless communication channel is improved to transmit user data, during the transmission time delay.

3. The method of claim 1, wherein the signal feedback includes one or more of uplink channel state information (CSI) for the wireless communication channel, a number of frames since a most-recent downlink CSI report for the wireless communication channel, or one or more downlink CSI reports for the wireless communication channel.

4. The method of claim 3, wherein the signal feedback indicates a relative change in the one or more downlink CSI reports, with respect to time, and a relative change in the uplink CSI, with respect to time.

5. The method of claim 3, wherein the signal feedback is received from one or more of the wireless communication device, a distributed unit (DU), and a central unit (CU).

6. The method of claim 3, wherein the vector is an aggregation of the uplink CSI, the number of frames since the most-recent downlink CSI report, and the one or more downlink CSI reports.

7. The method of claim 1, further comprising:
    changing a type of beamforming, based on output of the trained machine learning model.

8. The method of claim 1, wherein the trained machine learning model is trained using contextual bandit learning, wherein the plurality of rewards are functions of downlink throughput from the base station to the wireless communication device and uplink overhead of the signal feedback from the wireless communication device to the base station.

9. The method of claim 1, further comprising:
    generating, based on the trained machine learning model, an estimated precoding matrix.

10. The method of claim 1, wherein the estimated precoding matrix is generated to reduce, for a system, bandwidth overhead, compute time, and compute resources spent on channel estimation and feedback for the wireless communication channel.

11. The method of claim 1, wherein the plurality of transmission time delays comprises a first transmission time delay and a second transmission time delay different than the first transmission time delay.

12. The method of claim 11, wherein the plurality of rewards comprise a first reward calculated for the first transmission time delay and a second reward calculated for the second transmission time delay, wherein the first reward is different than the second reward.

13. A system for determining reference symbol transmission times, the system comprising:
    at least one processor;
    memory storing instructions that, when executed by the at least one processor, cause the system to perform a set of operations, the set of operations comprising:
        receive signal feedback based on a wireless communication channel between a wireless communication device and a base station;

identify a periodic exchange of reference symbols that are used to adjust beamforming between the wireless communication device and the base station;
generate a vector based on the signal feedback;
provide the vector as an input to a trained machine learning model, wherein a training of the trained machine learning model comprises:
receiving a plurality of signal feedbacks for the wireless communication channel, each signal feedback corresponding to a respective frame of time, and each signal feedback of the plurality of signal feedbacks including a respective downlink throughput and uplink overhead;
selecting a plurality of transmission time delays for reference symbols, each transmission time delay of the plurality of transmission time delays being selected based on a respective signal feedback of the plurality of signal feedbacks; and
calculating a plurality of rewards, each reward of the plurality of rewards being calculated for a respective transmission time delay of the plurality of transmission time delays, the plurality of rewards each being calculated based on a change in downlink throughput between consecutive signal feedbacks of the plurality of signal feedbacks and a change in uplink overhead between consecutive signal feedbacks of the plurality of signal feedbacks, and at least one of the change in downlink throughput and the change in uplink overhead being weighted based upon a priority level of the wireless communication device; and
select a transmission time delay from the plurality of transmission time delays for a reference symbol to be transmitted to the wireless communication device, the selected transmission time delay having the greatest reward of the plurality of calculated rewards; and
transmit the reference symbol, after the transmission time delay, to disrupt the periodic exchange of reference symbols.

14. The system of claim 13, wherein the signal feedback includes one or more of uplink channel state information (CSI) for the wireless communication channel, a number of frames since a most-recent downlink CSI report for the wireless communication channel, or one or more downlink CSI reports for the wireless communication channel.

15. The system of claim 14, wherein the vector is an aggregation of the uplink CSI, the number of frames since the most-recent downlink CSI report, and the one or more downlink CSI reports.

16. The system of claim 13, wherein the trained machine learning model is trained using contextual bandit learning, wherein the plurality of rewards are functions of downlink throughput from the base station to the wireless communication device and uplink overhead of the signal feedback from the wireless communication device to the base station.

17. The system of claim 13, further comprising:
generating, based on the trained machine learning model, an estimated precoding matrix.

18. A method for generating a precoding matrix, the method comprising:
receiving signal feedback based on a wireless communication channel between a wireless communication device and a base station;
generating a vector based on the signal feedback;
providing the vector as an input to a trained machine learning model, wherein a training of the trained machine learning model comprises:
receiving a plurality of signal feedbacks for the wireless communication channel, each signal feedback corresponding to a respective frame of time, and each signal feedback of the plurality of signal feedbacks including a respective downlink throughput and uplink overhead;
selecting a plurality of transmission time delays for reference symbols, each transmission time delay of the plurality of transmission time delays being selected based on a respective signal feedback of the plurality of signal feedbacks; and
calculating a plurality of rewards, each reward of the plurality of rewards being calculated for a respective transmission time delay of the plurality of transmission time delays, the plurality of rewards each being calculated based on a change in downlink throughput between consecutive signal feedbacks of the plurality of signal feedbacks and a change in uplink overhead between consecutive signal feedbacks of the plurality of signal feedbacks, and at least one of the change in downlink throughput and the change in uplink overhead being weighted based upon a priority level of the wireless communication device; and
generating, based on the trained machine learning model, a precoding matrix.

19. The method of claim 18, further comprising:
identifying a periodic exchange of reference symbols that are used to adjust beamforming between the wireless communication device and the base station;
determining, based on the trained machine learning model, a transmission time delay for a reference symbol to be transmitted to the wireless communication device; and
transmitting the reference symbol, after the transmission time delay, to disrupt the periodic exchange of reference symbols.

20. The method of claim 18, wherein the precoding matrix is generated to reduce, for a system, bandwidth overhead, compute time, and compute resources spent on channel estimation and feedback for the wireless communication channel.

* * * * *